United States Patent
Britton

(10) Patent No.: US 6,265,112 B1
(45) Date of Patent: Jul. 24, 2001

(54) METHOD OF MAKING A NICKEL FIBER ELECTRODE FOR A NICKEL BASED BATTERY SYSTEM

(75) Inventor: Doris L. Britton, North Olmsted, OH (US)

(73) Assignee: The United States of America as represented by the Adminstrator of the National Aeronautics and Space Adminstration, Washington, DC (US)

( * ) Notice: Subject to any disclaimer, the term of this patent is extended or adjusted under 35 U.S.C. 154(b) by 0 days.

(21) Appl. No.: 08/331,067

(22) Filed: Oct. 27, 1994

(51) Int. Cl.$^7$ ................................................ H01M 2/16
(52) U.S. Cl. .................. 429/623.1; 429/22.5; 429/235; 429/236; 429/623.1
(58) Field of Search ................. 429/223, 235, 429/236; 29/623.1, 623.5; 205/60, 57

(56) References Cited

U.S. PATENT DOCUMENTS

| | | | |
|---|---|---|---|
| 3,507,699 | * 4/1970 | Pell et al. | 205/60 |
| 4,224,392 | 9/1980 | Oswin | 429/206 |
| 4,269,670 | * 5/1981 | Smith | 204/15 |
| 4,337,124 | 6/1982 | Maskalick | 204/2.1 |
| 4,370,214 | * 1/1983 | Kadija | 429/236 |
| 4,863,484 | * 9/1989 | Beauchamp et al. | 429/223 |
| 4,985,318 | 1/1991 | Oshitani et al. | 429/223 |
| 5,023,155 | 6/1991 | Charkey et al. | 429/233 |
| 5,100,748 | * 3/1992 | Doniat et al. | 205/60 |
| 5,200,282 | 4/1993 | Ohnishi et al. | 429/223 |
| 5,248,510 | * 9/1993 | Lim et al. | 429/236 |

* cited by examiner

Primary Examiner—Carol Chaney
(74) Attorney, Agent, or Firm—Kent N. Stone; Susan D. Reinecke; Gene E. Shook

(57) ABSTRACT

The general purpose of the invention is to develop a high specific energy nickel electrode for a nickel based battery system. The invention discloses a method of producing a lightweight nickel electrode which can be cycled to deep depths of discharge (i.e., 40% or greater of electrode capacity). These deep depths of discharge can be accomplished by depositing the required amount of nickel hydroxide active material into a lightweight nickel fiber substrate.

8 Claims, 4 Drawing Sheets

METHOD OF MAKING A NICKEL FIBER ELECTRODE FOR A NICKEL BASED BATTERY SYSTEM

ORIGIN OF THE INVENTION

The invention described herein was made by an employee of the United States Government and may be manufactured and used for the Government for governmental purposes without the payment of any royalties thereon or therefore.

FIELD OF THE INVENTION

The present invention is directed to the field of batteries. The nickel electrode has been identified as the most critical and heaviest component of any nickel-based battery system. The state-of-the-art (SOA) nickel electrode has been made conventionally by sintering fine nickel powder onto a wire screen at elevated temperatures, (1000° C.) in a reduced atmosphere. The nickel hydroxide active material is then deposited into the pores of the substrate either by chemical or electrochemical methods. This process creates a material that has a highly conductive and porous substrate, but also has the disadvantage of being heavy in weight.

It is therefore an object of the present invention to produce a lightweight nickel fiber electrode that will increase the specific energy of the prior art nickel-based battery system.

It is another object of the present invention to develop a lightweight nickel electrode using a 2-micron diameter nickel fiber.

It is a further object of the present invention to treat the nickel electrodes prior to the formation and cycle life procedure.

Description of the Related Art

U.S. Pat. No. 4,224,392 by Oswin relates to a high capacity, low weight nickel based storage battery including a nickel electrode structure. U.S. Pat. No. 4,337,124 by Maskalick relates to the production of nickel plaques. U.S. Pat. No. 4,985,318 by Oshitani is directed to a nickel electrode and method of making in which a porous metal fiber is impregnate with active nickel hydroxide. U.S. Pat. No. 5,023,155 by Charkey is directed to a coating process for nickel electrodes using boron to improve the discharge current density and improve the number of recharge cycles during the batteries life. U.S. Pat. No. 5,200,282 to Ohnishi is directed to a nickel electrode consisting of a wire mesh to provide high porosity allowing high current densities and improved performance characteristics.

SUMMARY OF THE INVENTION

The most recent advance in the nickel electrode that are expected to have a positive effect on the cycle life, weight, cost and performance, is the use of a lightweight nickel substrate in place of the heavy-sintered nickel substrate.

The present invention is directed to a method of developing a high specific energy nickel electrode for any nickel-based battery system such as the nickel-hydrogen ($NiH_2$), nickel-cadmium (NiCd), nickel-metal hydride (NiMH) and nickel-zinc (NiZn). The main goal is to produce a lightweight nickel electrode which can be cycled at deep depths of discharge. This can be accomplished by depositing the required amount of nickel hydroxide active material into a lightweight nickel fiber substrate.

BRIEF DESCRIPTION OF THE DRAWINGS

The objects, advantages, and novel features of the invention will be more fully apparent from the following detailed description when read in connection with the accompanying drawings in which.

DESCRIPTION OF THE PREFERRED EMBODIMENT

The invention disclosed involves the use of a 2 micron diameter nickel fiber substrate as the support for the nickel hydroxide ($Ni(OH)_2$) active material. The nickel substrate has a high surface area which is required for high active material utilization.

One advantage of the lightweight substrates over the SOA sintered substrates is that the lightweight substrates can be manufactured with much larger porosities than the SOA substrates. The nickel fiber substrates are available in porosities up to 98% while commercial substrates are available in porosities of only 80 to 85%.

Figure 1:
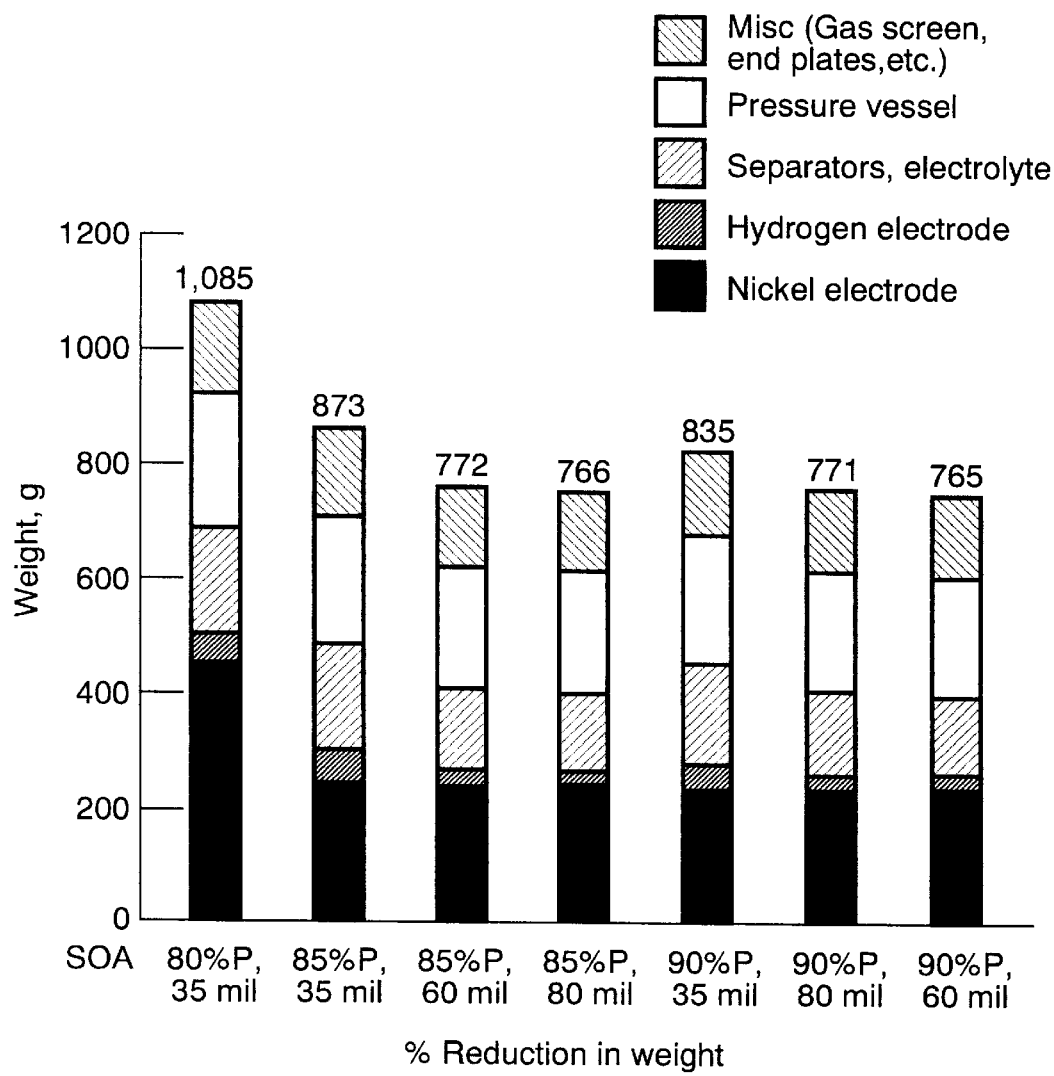
FIG. 1. displays a graph of the weight of the components of a nickel-hydrogen battery.

In addition, the use of a thicker nickel fiber electrode (e.g., 80 mil), will reduce the required number of electrodes and separators thereby reducing total cell weight. Using a high porous, thick, nickel electrode will improve the weight and cost of a nickel-based battery. FIG. 1 shows the comparison of the weights of a typical 50 AH nickel-hydrogen (Ni—$H_2$) cell using SOA sintered nickel electrodes, with cells using Nickel-fiber electrodes of various porosities and thicknesses. The weight of the Ni—$H_2$ cell improves, to as much as 30%, as the values of the variables increase. The graph of FIG. 1 displays the relative weights of the different parts of the battery. In FIG. 1 the weights of the pressure vessel, separators, electrolytes, hydrogen electrode, and miscellaneous fastening devices are displayed. Each of the battery cells in FIG. 1 is composed of a pressure vessel which contains the various parts of the battery. The nickel electrode is separated from a hydrogen electrode by a battery separator. An electrolyte substance maintains the wetness in the cell and helps to facilitate the charge transfer from the nickel electrode to the hydrogen electrode. The weights of each of these components is displayed for an 80%, 85%, and 90% porosity battery.

The graph in FIG. 1 discloses, that an 80% porosity SOA nickel electrode at 35 mil weighs about 460 grams. A 85% porosity nickel-fiber electrode with a thickness of 35 mil weighs about 250 grams. A nickel-fiber electrode at 85% porosity with a thickness of about 60 mil weighs about 240 grams. A nickel-fiber electrode with 85% porosity and a thickness of about 80 nil weighs about 250 grams. A nickel-fiber electrode with 90 porosity and a thickness of about 35 mil weighs about 230 grams. A nickel-fiber electrode with about 90% porosity and about 80 nil weighs about 240 grams. A nickel-fiber electrode with about 90% porosity and about 60 mil thickness will have a weight of about 235 grams.

In the present invention a nickel hydroxide active material is deposited onto a 2-micron nickel fiber substrate obtained from Ribbon Technology. The nickel substrate is then electrochemically impregnated in an aqueous solution consisting of 1.5 molar nickel nitrate, 0.175 molar cobalt nitrate, and 0.075 molar sodium nitrite. The substrates are impregnated at a current density of 40 to 54 mA/cm$^2$ for 5 to 7 hours (depending on the thickness and porosity of the substrate material), at a temperature of 95 to 100° C. The impregnated substrates, which are now referred to as electrodes, are treated with cobalt solution by dipping the electrode into a 1.8 molar cobalt nitrate solution for 20 minutes. This cobalt-dipping improves the initial performance of the electrode. The electrodes are then subjected to a formation process which requires eight cycles of 20-minute charge and 20-minute discharge at a high current density (70 mA/cm$^2$) in 26% solution of potassium hydroxide. The purpose of this process is to remove any impurities in the active material and to give the active material electrochemical "exercise" by a repeated oxidation-reduction process. It was determined that an additional dipping in 1.8 molar cobalt nitrate solution for 20 minutes after formation will further improve the initial performance of the nickel fiber electrode.

The parameters that determine a good electrode for life cycle testing are the active material loading level, theoretical capacity, and thickness expansion of the electrode all of which are calculated from the weight pick-up and thickness of the electrode. The electrodes, which are loaded from 1.6 to 1.8 g of the active material/cm$^3$ void volume, are then tested further in a life cycle test using a half-cell configuration. A State of the Art (SOA) nickel electrode is used as the counter-electrode (anode or negative electrode). Asbestos is used as the separator and a mercury/mercuric oxide reference electrode is used to measure the voltage of the test electrode. A constant current cycling regime of 55 minute charge and 35 minute discharge, is used to test the electrodes. Promising electrodes are fabricated into a scaled up size electrode, according to predefined specifications, and are then assembled and tested in NiH$_2$ boilerplate cells.

Figure 2:
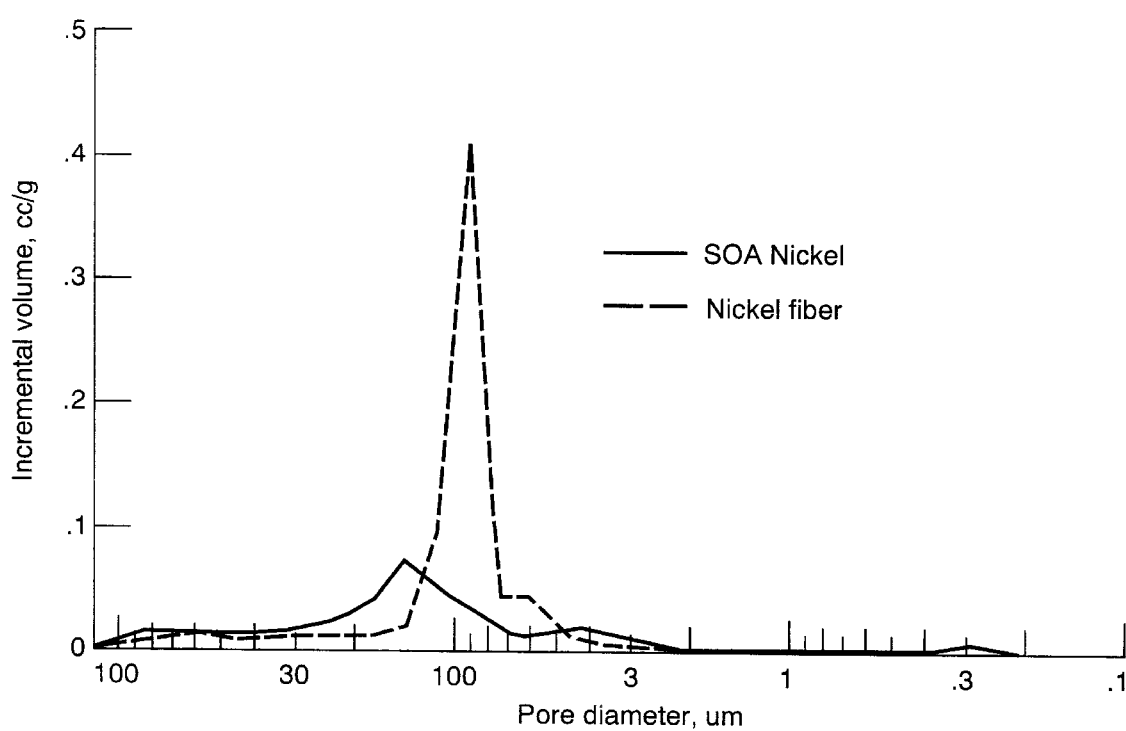
FIG. 2. displays the pore size distribution curves of the nickel substrates.

FIG. 2 depicts the pore size distribution curves of the SOA nickel and the 2-micron diameter nickel fiber substrates. The nickel fiber substrate have a large amount of pores distributed in the range of from 4 to 100 micron with a maximum area of 0.4 cm$^3$/g. This is distinguished from the SOA nickel fiber which has a smaller pore size distribution peak, in the range of 3 to 100 microns pore diameter, with a maximum area of about 0.07 cm$^3$/g.

Figure 3:
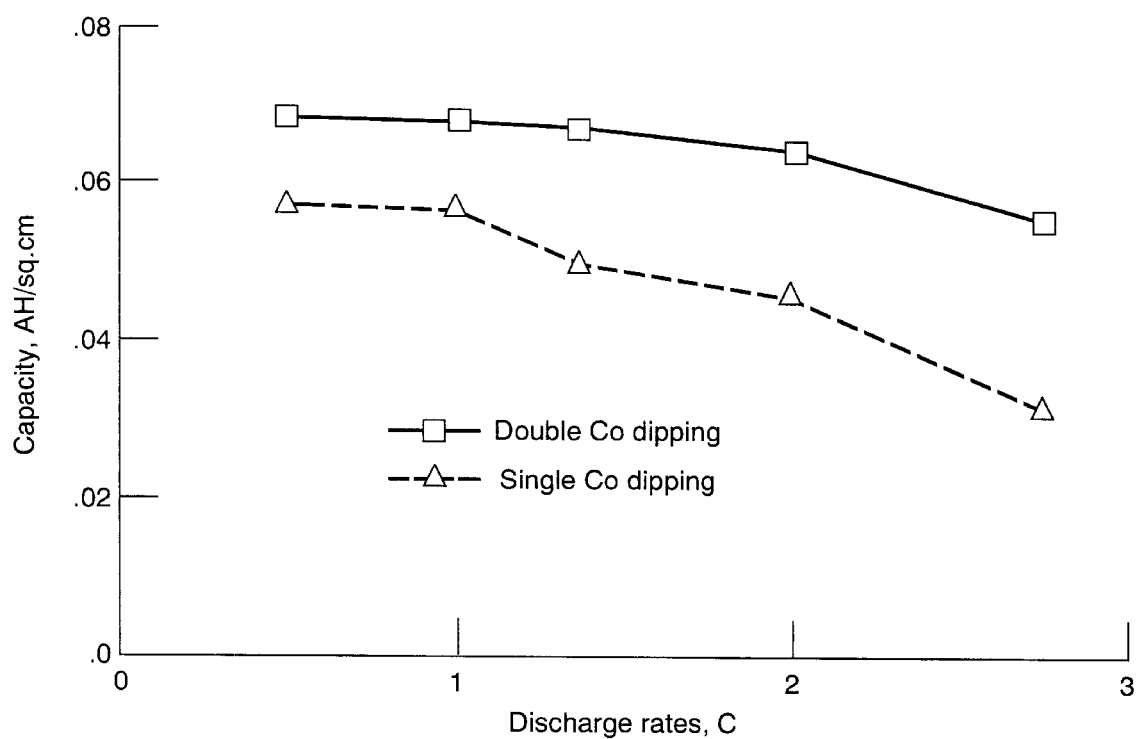
FIG. 3. displays the graph of the capacity of the nickel fiber electrode at various discharge rates.

FIG. 3 displays the initial half-cell capacity measured in AH/cm$^2$ as a function of the discharge rates for cobalt-single and double-dipped nickel fiber electrodes. The graph displays capacity measured in AH/sq.cm as a function of the discharge rates for single and double-dipped nickel fiber electrodes.

The lightweight nickel fiber electrodes have a disadvantage of having poor performance during the cycle life of the electrode. The addition of cobalt to the nickel active material improves the electrode performance. The capacity of the double dipped electrode is about 20% higher at the low rate of C/2. The difference increases as the rate increases (35%, 40% and 75% at the C, 2C and 2.8C rates respectively).

Figure 4:
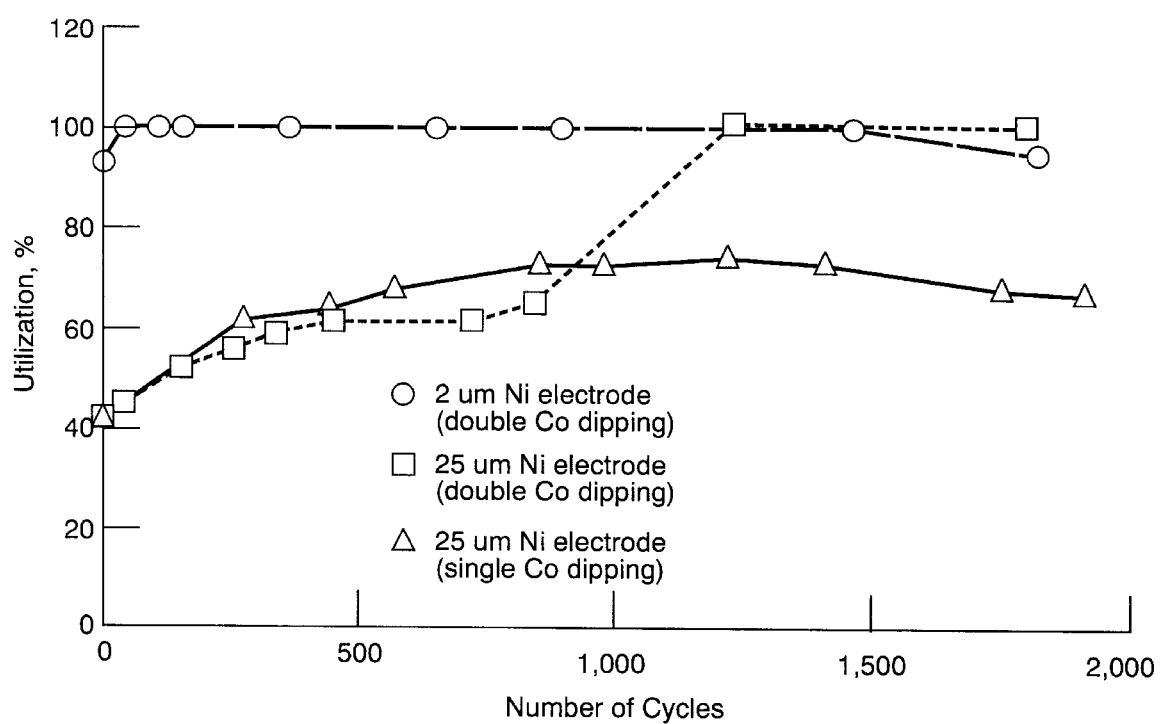
FIG. 4. displays the graph of the half-cell cycle lives of the nickel fiber electrodes.

The utilization curves of the 2 and 25-micron nickel fiber electrodes are shown in FIG. 4. Utilization is the ratio of the measured capacity to the theoretically calculated capacity based on the weight of the active material deposited. The larger diameter (25-micron) nickel fiber electrodes have low initial utilization which increase during cycling with the single-dipped electrode not reaching 100%. The utilization of the single-dipped 25 micron nickel fiber electrode started at about 47% and reached its maximum utilization of 74% after about 850 cycles. On the other hand, the utilization of the double-dipped 25-micron nickel fiber electrode started at 43% and reached its maximum utilization data of about 103% after 1220 cycles. Best results are obtained using a smaller diameter nickel fiber with a double treatment of cobalt. The utilization of the double-dipped smaller diameter (2-micron) nickel fiber electrode started at about 94% (twice the value as the larger diameter electrode) at the beginning of the cycle and reached its maximum utilization of 100% earlier after 40 cycles.

Alternate Embodiments

Other possible approaches to making a lightweight nickel electrode involve modifying the standard procedure. Using a lower current density for a longer period of time would improve the performance and cycle life of the nickel fiber electrode. (Example: A series of charge and discharge cycles at the C/2 rate for 132 minutes (10 cycles)).

Another approach is performed, by cathodically depositing a 1.0 molar cobalt nitrate solution into the electrode for a given current density, temperature and time (40 to 50 mA/cm$^2$, 50 to 100° C. and 15 seconds to 2 minutes). Lastly, applying the same type of substrate material and basic electrochemical procedure of depositing the active material to another alkaline battery electrode such as cadmium, zinc, iron, and silver is another method of making a lightweight nickel electrode.

In addition to the foregoing procedural variations, a lightweight nickel electrode can be produced by using different diameter-sized nickel fibers (i.e., 4, 8 and 12-micron). Another approach would involve varying the thickness and porosity of the nickel fiber substrate.

While several embodiments of the product and process are disclosed, it will be appreciated that various modifications may be made without departing from the spirit of the invention and the scope of the subjoined claims.

What is claimed is:

1. A method of producing an improved Nickel Fiber Electrode, comprising the steps of:

obtaining a nickel fiber substrate, electrochemically impregnating said nickel fiber substrate in an aqueous solution, thereby producing an electrode, dipping said electrode in a cobalt nitrate solution for approximately 20 minutes, thereby increasing the utilization of said electrode, immersing said electrode in a solution of potassium hydroxide and subjecting said electrode to about eight cycles of 20 minute charge and about eight cycles of 20 minute discharge at a current density of about 70 mA cm$^2$ in order to induce an oxidation reduction reaction, and dipping said electrode in said cobalt nitrate solution a second time, for approximately 20 minutes, thereby increasing said utilization of said electrode to at least 100 percent.

2. A method as claimed in claim 1 wherein the fibers of said nickel fiber substrate have a diameter of 2-microns.

3. A method as claimed in claim 1 wherein said aqueous solution is comprised of about 1.5 molar nickel nitrate, 0.175 molar cobalt nitrate, and 0.075 molar sodium nitrite.

4. A method as claimed in claim 3 wherein said nickel fiber substrate is impregnated at a current density of about 40 to about 54 mA/cm$^2$ for about 5 to about 7 hours.

5. A method as claimed in claim 4 wherein said nickel fiber substrate is impregnated at a temperature of about 95 to about 100° C.

6. A method as claimed in claim 1 wherein said cobalt nitrate solution is about 1.8 molar.

7. A method as claimed in claim 1 wherein said solution of potassium hydroxide is about 26% in weight.

8. A method of producing an improved Nickel Fiber Electrode, comprising the steps of:

obtaining a nickel fiber substrate, electrochemically impregnating said nickel fiber substrate in an aqueous solution, thereby producing an electrode, depositing a 1.0 molar cobalt nitrate solution into said electrode for about 40 to about 50 mA/cm$^2$ at a temperature of about 50 to about 100° C. for about 15 seconds to about 2 minutes, thereby increasing the utilization of said electrode, repeatedly charging and discharging said electrode while said electrode is emersed in a solution of potassium hydroxide a number of times sufficient to induce the oxidation-reduction process of said electrode, and depositing a 1.0 molar cobalt nitrate solution into said electrode for about 40 to about 50 mA/cm2 at a temperature of about 50 to about 100° C. for about 15 seconds to about 2 minutes, thereby increasing said utilization of said electrode to at least 100 percent.

* * * * *